United States Patent [19]
Emert et al.

[11] Patent Number: 6,051,537
[45] Date of Patent: *Apr. 18, 2000

[54] DISPERSANT ADDITIVE MIXTURES FOR OLEAGINOUS COMPOSITIONS

[75] Inventors: Jacob Emert, Brooklyn, N.Y.; Malcolm Waddoups, Westfield; Robert D. Lundberg, Bridgewater, both of N.J.

[73] Assignee: Exxon Chemical Patents Inc, Linden, N.J.

[ * ] Notice: This patent is subject to a terminal disclaimer.

[21] Appl. No.: 08/047,758

[22] Filed: Apr. 14, 1993

Related U.S. Application Data

[63] Continuation of application No. 07/680,204, Apr. 4, 1991, abandoned, which is a continuation of application No. 07/378,895, Jul. 12, 1989, Pat. No. 5,118,432, which is a continuation of application No. 07/095,056, Sep. 9, 1987, Pat. No. 4,863,624, which is a continuation-in-part of application No. 07/032,066, Mar. 27, 1987, abandoned, which is a continuation of application No. 06/754,001, Jul. 11, 1985, abandoned.

[51] Int. Cl.⁷ .................... C10M 145/14; C10M 149/04; C10M 155/04
[52] U.S. Cl. .................. 508/469; 471/194; 471/198
[58] Field of Search ............................ 252/49.6, 51.5 A, 252/56 D; 508/194, 198, 469, 471

[56] References Cited

U.S. PATENT DOCUMENTS

| Re. 26,330 | 1/1968 | Colfer | 208/48 |
|---|---|---|---|
| 3,087,936 | 4/1963 | LeSuer | 260/326.3 |
| 3,131,150 | 4/1964 | Stuart et al. | 252/34.7 |
| 3,154,560 | 10/1964 | Osuch | 260/326.3 |
| 3,172,892 | 3/1965 | LeSuer et al. | 260/326.5 |
| 3,198,736 | 8/1965 | Henderson | 252/46.7 |
| 3,215,707 | 11/1965 | Rense | 260/326.3 |
| 3,219,666 | 11/1965 | Norman et al. | 260/268 |

(List continued on next page.)

FOREIGN PATENT DOCUMENTS

| 0895398 | 3/1972 | Canada . |
|---|---|---|
| 0072645 | 2/1983 | European Pat. Off. . |
| 0082601 | 6/1983 | European Pat. Off. . |
| 0035347 | 1/1984 | European Pat. Off. . |
| 1368277 | 9/1974 | United Kingdom . |
| 1398008 | 6/1975 | United Kingdom . |
| 2061958 | 5/1981 | United Kingdom . |
| 2081274 | 2/1982 | United Kingdom . |
| 2081722 | 2/1982 | United Kingdom . |
| 8503504 | 8/1985 | WIPO . |

OTHER PUBLICATIONS

European Search Report (EP 87 30 9003) Date Unavailable.

E. S. Forbes et al., "The Mechanism of Action of Polyisobutenyl Succinimide Lubricating Oil Additives", *Tribology*, vol. 5, No. 2, 72–77 (Apr. 1972).

*Primary Examiner*—Margaret B. Medley

[57] ABSTRACT

Novel dispersant mixtures are provided, having improved lubricating oil performance characteristics, comprising nitrogen or ester containing dispersants selected from the group consisting of oil soluble salts, amides, imides, oxazoline and esters or mixtures thereof, wherein a first dispersant comprises a long chain hydrocarbon substituted mono- and dicarboxylic acid or their anhydrides derived from polymers of $C_2$ to $C_{10}$ monoolefins wherein the polymer has a number average molecular weight of at least about 1300 and wherein the second dispersant component is derived from such polymers having a number average molecular weight of from about 700 to 1150. The relatively high molecular weight dispersant is provided with from about 1.05 to 1.25 moles per mole of polyolefin of an alpha or beta unsaturated $C_4$ to $C_{10}$ dicarboxylic acid or anhydride or ester thereof. The relatively lower molecular weight dispersant is provided with from about 1.2 to 2.0 moles per mole of polyolefin of an alpha or beta unsaturated $C_4$ to $C_{10}$ dicarboxylic acid, anhydride or ester thereof. It has been found that mixtures of such high molecular weight-low functionality dispersants and low molecular weight-high functionality dispersants provides a dispersant, suitable for use in oleaginous materials such as lubricating oils, which provide surprisingly improved engine performance properties.

33 Claims, 1 Drawing Sheet

U.S. PATENT DOCUMENTS

| | | | |
|---|---|---|---|
| 3,231,587 | 1/1966 | Rense | 260/346.8 |
| 3,235,484 | 2/1966 | Colfer | 208/48 |
| 3,254,025 | 5/1966 | LeSuer | 252/32.7 E |
| 3,269,946 | 8/1966 | Wiese | 252/32.5 |
| 3,272,743 | 9/1966 | Norman et al. | 252/32.5 |
| 3,272,746 | 9/1966 | LeSuer et al. | 252/47.5 |
| 3,278,550 | 10/1966 | Norman et al. | 260/326.3 |
| 3,284,409 | 11/1966 | Dorer | 252/49.9 |
| 3,284,410 | 11/1966 | Meinhardt | 252/49.6 |
| 3,288,714 | 11/1966 | Osuch | 252/57 |
| 3,401,118 | 9/1968 | Benoir | 252/51.5 |
| 3,403,102 | 9/1968 | LeSuer | 252/49.8 |
| 3,444,170 | 5/1969 | Norman et al. | 260/268 |
| 3,562,159 | 2/1971 | Mastin | 252/32.7 |
| 3,576,743 | 4/1971 | Widmer et al. | 252/51.5 |
| 3,632,510 | 1/1972 | LeSuer | 252/35 |
| 3,755,169 | 8/1973 | Adams et al. | 252/56 D |
| 3,806,456 | 4/1974 | Vogel | 252/51.5 A |
| 3,836,470 | 9/1974 | Miller | 252/51.5 |
| 3,836,471 | 9/1974 | Miller | 252/51.5 |
| 3,838,050 | 9/1974 | Miller | 252/40.5 |
| 3,838,052 | 9/1974 | Miller | 252/56 R |
| 3,868,330 | 2/1975 | Meinhardt et al. | 252/56 D |
| 3,879,308 | 4/1975 | Miller | 252/56 R |
| 3,912,764 | 10/1975 | Palmer | 260/346.8 |
| 3,927,041 | 12/1975 | Cengel et al. | 260/346 |
| 3,936,480 | 2/1976 | Demoures et al. | 260/404.5 |
| 3,950,341 | 4/1976 | Okamoto et al. | 252/46.7 |
| 3,960,889 | 6/1976 | Cullen et al. | 252/51.5 A |
| 4,062,786 | 12/1977 | Brois et al. | 252/51.5 |
| 4,110,349 | 8/1978 | Cohen | 260/346.74 |
| 4,113,639 | 9/1978 | Lonstrup et al. | 252/51.5 |
| 4,116,876 | 9/1978 | Brois et al. | 252/49.6 |
| 4,123,373 | 10/1978 | Brois et al. | 252/48.6 |
| 4,151,173 | 4/1979 | Vogel | 260/326.5 F |
| 4,173,540 | 11/1979 | Lonstrup et al. | 252/49.6 |
| 4,195,976 | 4/1980 | Ryer et al. | 44/63 |
| 4,234,435 | 11/1980 | Meinhardt et al. | 252/51.5 A |
| 4,502,970 | 3/1985 | Schetelich et al. | 252/32.7 E |
| 4,502,971 | 3/1985 | Robson | 252/42.7 |
| 4,863,624 | 9/1989 | Emert et al. | 252/51.5 A |
| 4,873,004 | 10/1989 | Beverwijk | 252/32.5 |

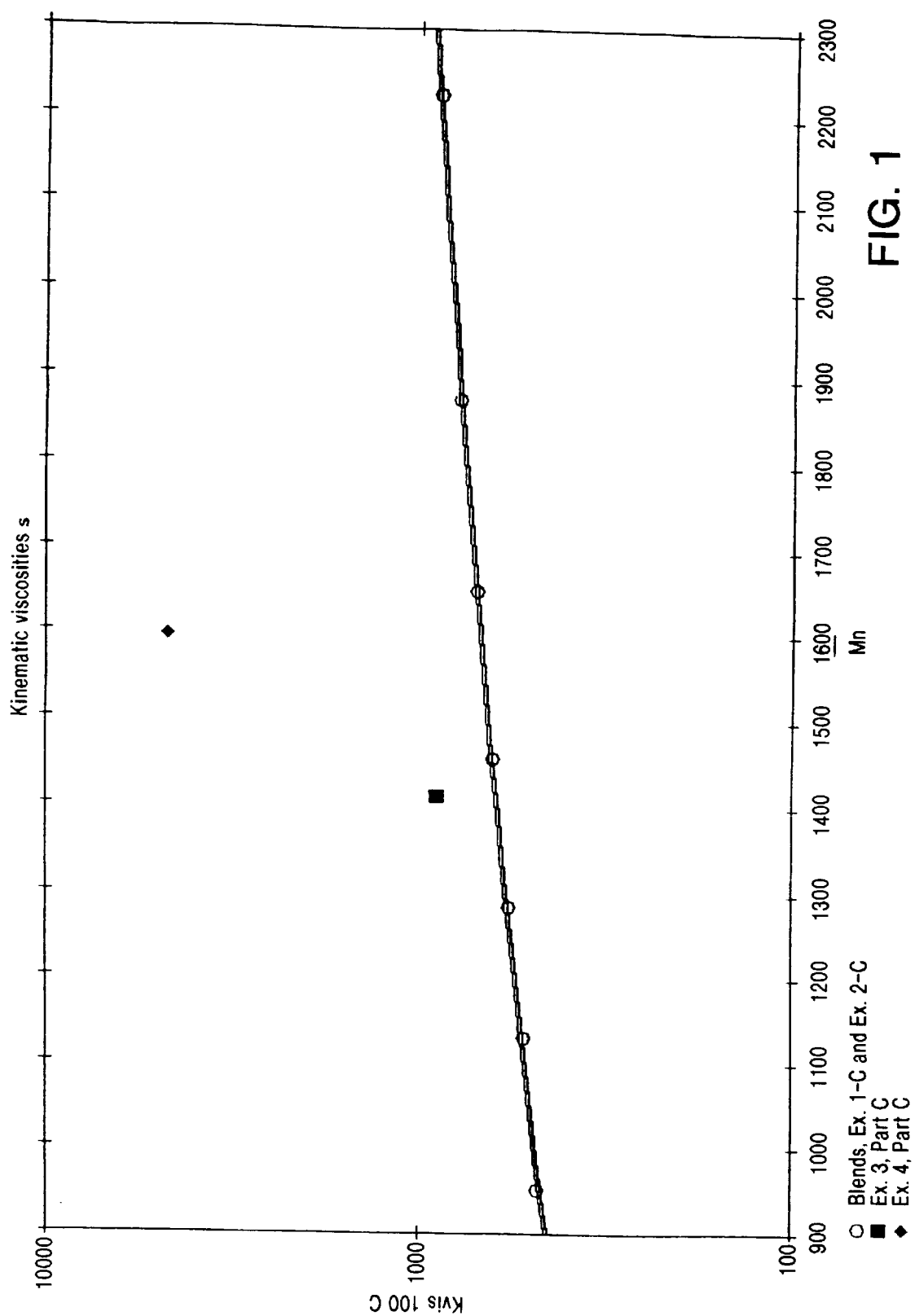

DISPERSANT ADDITIVE MIXTURES FOR OLEAGINOUS COMPOSITIONS

CROSS REFERENCE TO RELATED APPLICATIONS

This application is a continuation of Ser. No. 07/680,204 filed Apr. 4, 1991, now abandoned, which is a continuation of Ser. No. 378,895, filed Jul. 12, 1989, now U.S. Pat. No. 5,118,432, which was a continuation of Ser. No. 95,056, filed Sep. 9, 1987, now U.S. Pat. No. 4,863,624, which was a continuation-in-part Ser. No. 32,066, filed Mar. 27, 1987, now abandoned, which was a continuation of Ser. No. 754,001, filed Jul. 11, 1985, now abandoned.

FIELD OF THE INVENTION

This invention relates to improved oil soluble dispersant additives useful oleaginous compositions, including fuel and lubricating oil compositions, and to concentrates containing said additives.

BACKGROUND OF THE INVENTION

Canadian Patent 895,398 discloses reacting a mole of an unsaturated hydrocarbon group of 700 to 10,000 mol. wt. with 1 to 1.5 moles of chloro-substituted maleic or fumaric acid, which material can then be further reacted with alcohol.

U.S. Pat. No. 3,215,707 discloses reacting chlorine with a mixture of polyolefin up to 50,000 molecular weight, especially of 250 to 3,000 molecular weight with one or more moles of maleic anhydride depending upon whether one or more succinic anhydride radicals are to be in each polymer molecule.

U.S. Pat. No. 3,927,041 discloses a mole of polybutene of 300 to 3,000 mol. wt. containing 5 to 200 ppm 1,3-di-bromo-5,5-dialkylhydantoin as a catalyst reacted with 0.8 to 5, generally 1.05 to 1.15 moles of dicarboxylic acid or anhydride, to form materials which can be used per se, or as esters, amides, imides, amidines, in petroleum products.

U.S. Pat. No. 4,062,786 in Example 13 shows a polyisobutenylsuccinic anhydride of molecular weight of about 1300 and a Saponification Number of about 100.

U.S. Pat. Nos. 4,113,639 and 4,116,876 disclose an example of alkenyl succinic anhydride having a molecular weight of the alkenyl group of 1300 and a Saponification Number of 103 (about 1.3 succinic anhydride units per hydrocarbon molecule. This alkenyl succinic anhydride may be reacted with polyamine and then boric acid (U.S. Pat. No. 4,113,639), or may be reacted with an amino alcohol to form an oxazoline (U.S. Pat. No. 4,116,876) which is then borated by reaction with boric acid.

U.S. Pat. No. 4,123,373 in Example 3 shows a polyisobutenylsuccinic anhydride of about 1400 molecular weight having a Saponification Number of 80.

U.S. Pat. No. 4,234,435 discloses as oil additives, polyalkene substituted dicarboxylic acids derived from polyalkenes having a $M_n$ of 1300 to 5,000 and containing at least 1.3 dicarboxylic acid groups per polyalkene.

Further related prior disclosures, which are expressly incorporated herein by reference in their entirety are U.S. Pat. Nos.: 3,087,936; 3,131,150; 3,154,560; 3,172,892; 3,198,736; 3,219,666; 3,231,587; 3,235,484; 3,269,946; 3,272,743; 3,272,746; 3,278,550; 3,284,409; 3,284,410; 3,288,714; 3,403,102; 3,562,159; 3,576,743; 3,632,510; 3,836,470; 3,836,471; 3,838,050; 3,838,052; 3,879,308; 3,912,764; 3,927,041; Re. 26,330; 4,110,349; 4,113,639; 4,151,173; 4,195,976; and U.K. Patents 1,368,277 and 1,398,008.

U.S. Pat. No. 3,401,118 discloses mixed alkenyl succinimides prepared by reacting a polyisobutenyl succinic anhydride ($M_n$ 850–1200 PIB group) with an equal molar quantity of tetraethylene-pentamine and reacting the products so obtained with a lower molecular weight polyisobutenyl succinic anhydride $M_n$ 400–750 PIB group). Each polyisobutenyl succinic anhydride is prepared by conventional methods, and mol ratios of polybutene to maleic anhydride of from 1:1 to 1:10. The proportions of the above higher molecular weight polyisobutenyl succinic anhydrides is disclosed to vary from about 50 to about 98 mol percent.

In U.S. Ser. No. 755,603, filed Sep. 5, 1991, which is a Rule 62 continuation of U.S. Ser. No. 613,330, filed Nov. 8, 1990 (now abandoned), which was a Rule 60 continuation of U.S. Ser. No. 488,320, filed Mar. 5, 1990 (now abandoned), which was a Rule 60 of U.S. Ser. No. 235,920, filed Aug. 23, 1988 (now abandoned), which was a Rule 60 continuation of U.S. Ser. No. 32,066, filed Mar. 27, 1987 (abandoned), which was a Rule 60 continuation of U.S. Ser. No. 754,011, filed Jul. 11, 1985 (now abandoned oil soluble dispersant additives are disclosed wherein polyolefins of 1500 to 5000 number average molecular weight are substituted with 1.05 to 1.25 dicarboxylic acid producing moieties per polyolefin molecule. Such materials, with a functionality below 1.25:1, have been observed to minimize viscosity interaction with other additives while achieving an effective additive. The composition therein described represents an improvement in that the hydrocarbon polymer required to maintain the oil solubility of the dispersant during engine operation can be provided with fewer acylating units per polyamine. For example, a typical dispersant derived from a polybutene acylating agent with a functionality of 1.3 or more dicarboxylic acid groups per polymer, condensed with a polyethyleneamine containing 4–7 nitrogen atoms per molecule, would require two or more acylating units per polyamine to provide sufficient oil solubility for adequate dispersancy in gasoline and diesel engines. Reducing the functionality below 1.25 generates the requisite ratio of oil-soluble polymer per polyamine at a lower relative stoichiometry of acylating agent per polyamine. Thus, a dispersant derived from a polybutene acylating agent with a functionality of 1.05 condensed with a 5-nitrogen polyethyleneamine in a ratio of 1.5 to 1 contains approximately the same ratio of non-polar to polar groupings as a dispersant made from a polybutene acylating agent with a functionality of 1.4 condensed with the same polyamine in a ratio of 2:1. The former composition would be considerably lower in viscosity and exhibit reduced interactions relative to the latter.

U.S. Ser. No. 250,887, filed Sep. 29, 1988, as a Rule 60 Continuation of U.S. Ser No. 146,307 filed Jan. 21, 1988, which was a Rule 60 Continuation of Ser. No. 919,395, filed Oct. 16, 1986 now abandoned relates to dispersant materials having improved effectiveness as dispersants coupled with enhanced low temperature properties. These inventive materials are particularly useful with V.I. improvers in formulating multigrade oils.

Multigrade lubricating oils typically are identified by two numbers such as 10W30, 5W30 etc. The first number in the multigrade designation is associated with a maximum low temperature (e.g. −20° C.) viscosity requirement for that multigrade oil as measured typically by a cold cranking simulator (CCS) under high shear, while the second number in the multigrade designation is associated with a minimum high temperature (e.g. 100° C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about −30 to about −5° C. By "high temperature" as used herein is meant temperatures of typically at least about 100° C.

The minimum high temperature viscosity requirement, e.g. at 100° C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which efficiently meets both low and high temperature viscosity requirements, the formulator may use a single oil of desired viscosity or a blend of two lubricating oils of different viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g. S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulator's task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A typical 10W30 U.S. Service Station commercial oil contains from 3 to 4 times as much dispersant as V.I. improver (as measured by the respective dispersant and V.I. improver active ingredients). In addition to dispersancy, conventional dispersants can also increase the low and high temperature viscosity characteristics of a base oil simply by virtue of its polymeric nature. In contrast to the V.I. improver, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the V.I. improver. Thus, the magnitude of the low temperature viscosity increase induced by the dispersant can exceed the low temperature viscosity increase induced by the V.I. improver without the benefit of a proportionately greater increase in high temperature viscosity as obtained from a V.I. improver. Consequently, as the dispersant induced low temperature viscosity increase causes the low temperature viscosity of the oil to approach the maximum low temperature viscosity limit, the more difficult it is to introduce a sufficient amount of V.I. improver effective to meet the high temperature viscosity requirement and still meet the low temperature viscosity requirement. The formulator is thereby once again forced to shift to the undesirable expedient of using higher proportions of low viscosity oil to permit addition of the requisite amount of V.I. improver without exceeding the low temperature viscosity limit.

The dispersants of U.S. Ser. No. 250,887, filed Sep. 29, 1988, as a Rule 60 Continuation of U.S. Ser. No. 146,307 filed Jan. 21, 1988, which was a Rule 60 Continuation of Serial No. 919,935 now abandoned were observed to possess inherent characteristics such that they contribute considerably less to low temperature viscosity increases than dispersants of the prior art while achieving similar high temperature viscosity increases. Moreover, as the concentration of dispersant in the base oil is increased, this beneficial low temperature viscosity effect becomes increasingly more pronounced relative to conventional dispersants. This advantage is especially significant for high quality heavy duty diesel oils which typically require high concentrations of dispersant additive. Furthermore, these improved viscosity properties facilitate the use of V.I. improvers in forming multigrade oils spanning a wider viscosity requirement range, such as 5W30 oils, due to the overall effect of lower viscosity increase at low temperatures while maintaining the desired viscosity at high temperatures as compared to the other dispersants. More significantly, these viscometric properties also permit the use of higher viscosity base oils with attendant advantages in engine performances. The high level of functionality combined with the low molecular weight of 700 to 1200 of the olefin polymer component, results in said improved viscometric properties relative to either higher molecular weight polymer or to products with a lower degree of functionality.

Even further improvements, i.e. reductions, in low temperatures CCS viscosity are achieved by increasing the branching of the dispersant molecule in conjunction with control of the hydrocarbyl:polar group ratio. Increased branching is achieved by reacting the hydrocarbyl, substituted dicarboxylic acid or anhydride with a nucleophilic reactant having at least three acid reactive functional groups, e.g. amine, alcohol and mixtures thereof; and controlling the molar ratio of the acid or anhydride containing reactive moiety and nucleophilic reactant within defined limits as specified herein. In the dispersants of U.S. Ser. No. 250,887, filed Sep. 29, 1988, as a Rule 60 Continuation of U.S. Ser. No. 146,307 filed Jan. 21, 1988, which was a Rule 60 Continuation of Serial No. 919,935 now abandoned, as the degree of functionality of the nucleophilic reactant increases, this permits more than two hydrocarbyl substituted diacids or anhydride moieties to react therewith, thereby increasing the degree of branching of the resultant product and lowering the CCS viscosity thereof for a given high temperature viscosity. Furthermore, the lower molecular weight of the polymers results in easier handling of the concentrate relative to high molecular weight, high functionality systems which tend to be gel-like.

SUMMARY OF THE INVENTION

The present invention is directed to a dispersant additive mixture comprising (A) a first dispersant comprising a reaction product of a polyolefin of 1500 to 5,000 number average molecular weight substituted with 1.05 to 1.25, preferably 1.06 to 1.20, e.g., 1.10 to 1.20 dicarboxylic acid producing moieties (preferably acid or anhydride moieties) per polyolefin molecule, with a first nucleophilic reactant selected from the group consisting of amines, alcohols, amino-alcohols and mixtures thereof; and (B) a second dispersant comprising a reaction product of a second polyolefin of 700 to 1150 number average molecular weight substituted with 1.2 to 2.0, preferably 1.3 to 1.8, e.g., 1.4 to 1.7, dicarboxylic acid producing moieties (preferably acid or anhydride moieties) per polyolefin molecule, with a second nucleophilic reactant selected from the group consisting of amine, alcohols, amino-alcohols and mixtures thereof, wherein the weight ratio of A:B is from about 0.1:1 to 10:1.

The materials of the invention have been surprisingly found to simultaneously provide enhanced diesel performance and to exhibit superior viscometric properties. As compared to those prior disclosures mentioned above which have a functionality of 1.3 or more dicarboxylic acid producing groups per hydrocarbon moiety randomly distributed over the polyolefin molecule substituents used in the reaction, the present invention has found. the above noted advantages to flow from controlling the degree of functionality and molecular weight of two, individually prepared dispersant components.

In the dispersant mixtures of the present invention, the high degree of functionality is localized in the low molecular weight dispersant components, and the low degree of functionality is localized in the high molecular weight components, rather than being randomly distributed throughout the dispersant molecules. The dispersant mixtures of the present invention do not suffer the pronounced handling difficulties of the above high molecular weight, high functionality dispersants in view of these surprisingly improved viscometric properties. Therefore, the dispersant mixtures of this invention enable the incorporation of desirably higher levels of functionality and achieve the improved disperancy required in modern oils (which, due to their operation in modern engines under more severe, high temperature conditions, produce correspondingly larger amounts of sludge-forming solids which must be suspended in the oil to minimize engine deposits and to thereby extend engine life).

Therefore, the present invention is also directed to novel processes for preparing the dispersant mixtures and hereby each component is individually made to achieve the indicated degree of functionality for the selected olefin polymer molecular weight, and thereafter each is blended to achieve the surprisingly improved compositions of the present invention.

BRIEF DESCRIPTION OF THE DRAWING

FIG. 1 is a graphical plot of the kinematic viscosity data of Example 5 versus $M_n$.

DETAILED DESCRIPTION OF THE INVENTION

Preparation of Dispersant Component A and B

Ashless dispersants useful in this invention as Component A and Component B dispersants comprise nitrogen or ester containing dispersants selected from the group consisting of oil soluble salts, amides, imides, oxazolines and esters, or mixtures thereof, of long chain hydrocarbon substituted mono and dicarboxylic acids or their anhydrides wherein said long chain hydrocarbon group is a polymer of a $C_2$ to $C_{10}$, e.g., $C_2$ to $C_5$, monoolefin, said polymer having a number average molecular weight of at least about 1500 for Component A, and from about 700 to 1150 for Component B.

The long chain hydrocarbyl substituted mono or dicarboxylic acid material, i.e. acid, anhydride, or ester, used in Component A dispersant includes long chain hydrocarbon, generally a polyolefin, substituted with an average of from about 1.05 to 1.25, preferably from about 1.06 to 1.20, e.g., 1.10 to 1.20 moles, per mole of polyolefin, of an alpha or beta- unsaturated $C_3$, $C_4$ or $C_9$ manocarboxylic acid or $C_4$ to $C_{10}$ dicarboxylic acid, or anhydride or ester thereof. The long chain hydrocarbyl monocarboxylic acid or substituted dicarboxylic acid producing material, e.g., acid, anhydride, or ester, used in the Component B dispersant includes a long chain hydrocarbon, generally a polyolefin, substituted typically with an average of about 1.2 to 2.0 (e.g., 1.2 to 1.8), preferably about 1.3 to 1.8 (e.g., 1.3 to 1.6), and most preferably about 1.4 to 1.7 (e.g., 1.4 to 1.6) moles, per mole of polyolefin, of an alpha- or beta unsaturated $C_3$, $C_4$ or $C_9$ monocarboxylic acid or $C_4$ to $C_{10}$ dicarboxylic acid, anhydride or ester thereof. Exemplary of such dicarboxylic acids, anhydrides and esters thereof are fumaric acid, itaconic acid, maleic acid, maleic anhydride, chloromaleic acid, dimethyl fumarate, and chloromaleic anhydride, and of such monocarboxylic acids are acrylic acid, methacrylic acid, crotonic acid, cinnamic acid, etc.

Preferred olefin polymers for reaction with the unsaturated dicarboxylic acids to form Component A and B dispersants are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used in the Component A dispersants will usually have number average molecular weights within the range of about 1500 and about 5,000, more usually between about 1500 and about 4000. Particularly useful olefin polymers have number average molecular weights within the range of about 1500 and about 3000 with approximately one terminal double bond per polymer chain. The olefin polymers used in making the Component B dispersants will usually have number average molecular weights within the range of about 700 and about 1150, e.g., 700 to 1100, more usually between about 800 and about 1000. Particularly useful olefin polymers have number average molecular weights within the range of about 900 and about 1000 with approximately one terminal double bond per polymer chain. An especially useful starting material for highly potent dispersant additives useful in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60 to 250° C., e.g. 120 to 160° C., for about 0.5 to 10, preferably 1 to 7 hours. The halogenated polymer may then be reacted with sufficient unsaturated acid or anhydride at 100 to 250° C., usually about 180° to 235° C., for about 0.5 to 10, e.g. 3 to 8 hours, so the product obtained will contain the desired number of moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g. polyisobutylene will normally react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin, e.g., 1.2 to 2.0 for Component A, etc. are based upon the total amount of polyolefin, that is, the total of both the reacted and unreacted polyolefin, used to make the product.

The dicarboxylic acid materials to be used in Component A dispersants must be prepared separately from the dicarboxylic acid materials to be used in Component B dispersants, in order for the critical control of the distribution of functionality on the relatively low molecular weight Component B dispersant to be used in the novel dispersant mixtures of this invention.

The dicarboxylic acid producing materials can also be further reacted with amines, alcohols, including polyols, amino-alcohols, etc., to form other useful dispersant additives. Thus, if the acid producing material is to be further reacted, e.g., neutralized, then generally a major proportion of at least 50 percent of the acid units up to all the acid units will be reacted. Again, the dicarboxylic acid material intended for use in Component A must be so reacted separately from the Component B precursor dicarboxylic acid material.

Amine compounds useful as neucleophilic reactants for neutralization of the hydrocarbyl substituted dicarboxylic acid materials include mono- and (preferably) polyamines, most preferably polyalkylene polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitrites, imidazoline groups, and the like. Hydroxy amines with 1 to 6 hydroxy groups, preferably 1 to 3 hydroxy groups are particularly useful. Preferred amines are aliphatic saturated amines, including those of the general formulas:

and

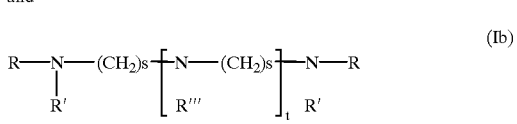

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", s, s', t and t' be selected in a manner sufficient to provide the compounds of Formulas Ia and Ib with typically at least one primary or secondary amine group, preferably at least two primary or secondary amine groups. This can be achieved by selecting at least one of said R, R', R" or R'" groups to be hydrogen or by letting t in Formula Ib be at least one when R'" is H or when the Ic moiety possesses a secondary amino group. The most preferred amine of the above formulas are represented by Formula Ib and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula:

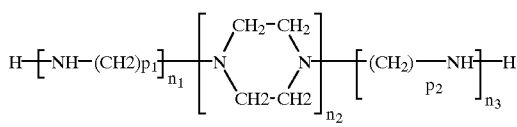

wherein $p_1$ and $P_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

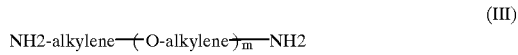

(III)

where m has a value of about 3 to 70 and preferably 10 to 35; and

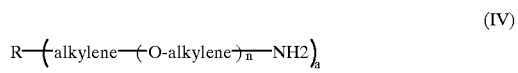

(IV)

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (III) or (IV) may be straight or branched chains containing about 2 to 7, and preferably about 2 to 4 carbon atoms.

The polyoxyalkylene polyamines of formulas (III) or (IV) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine is readily reacted with the selected dicarboxylic acid material, e.g. alkenyl succinic anhydride, by heating an oil solution containing 5 to 95 wt. % of dicarboxylic acid material to about 100 to 250° C., preferably 125 to 175° C., generally for 1 to 10, e.g. 2 to 6 hours until the desired amount of water is removed. The heating is preferably carried out to favor formation of imides or mixtures of imides and amides, rather than amides and salts. Reaction ratios of dicarboxylic material to equivalents of amine as well as the other neucleophilic reactants described herein can vary considerably, depending on the reactants and type of bonds formed. Generally from 0.1 to 1.0, preferably from about 0.2 to 0.6, e.g., 0.4 to 0.6, moles of dicarboxylic acid moiety content (e.g., grafted maleic anhydride content) is used per equivalent of neucleophilic reactant, e.g., amine. For example, about 0.8 mole of a pentaamine (having two primary amino groups and five equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e., preferably the pentaamine is used in an amount sufficient to provide about 0.4 mole (that is, 1.6 divided by (0.8×5) mole) of succinic anhydride moiety per nitrogen equivalent of the amine.

The nitrogen containing dispersants can be further treated by boration as generally taught in U.S. Pat. Nos. 3,087,936 and 3,254,025 (incorporated herein by reference thereto). This is readily accomplished by treating the selected acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 20 atomic proportions of boron for each atomic proportion of nitrogen of said acylated nitrogen composition. Usefully the dispersants of the inventive combination contain from about 0.05 to 2.0 wt. %, e.g. 0.05 to 0.7 wt. % boron based on the total weight of said borated acyl nitrogen compound. The boron, which appears to be in the product as dehydrated boric acid polymers (primarily $(HBO_2)_3$), is believed to attach to the dispersant imides and diimides as amine salts e.g. the metaborate salt of said diimide.

Treating is readily carried out by adding from about 0.05 to 4, e.g. 1 to 3 wt. % (based on the weight of said acyl nitrogen compound) of said boron compound, preferably boric acid which is most usually added as a slurry to said acyl nitrogen compound and heating with stirring at from about 135° C. to 190, e.g. 140–170° C., for from 1 to 5 hours followed by nitrogen stripping at said temperature ranges. Or, the boron treatment can be carried out by adding boric acid to the hot reaction mixture of the dicarboxylic acid material and amine while removing water.

The tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. Nos. 4,102, 798; 4,116,876 and 4,113,639.

The ashless dispersants (A) and/or (B) may also be esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022. The ester dispersants may also be borated, similar to the nitrogen containing dispersants, as described above.

Hydroxyamines which can be reacted with the aforesaid long chain hydrocarbon substituted dicarboxylic acid materials to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1, 3-propane-diol, 2-amino-2-ethyl-1, 3-propanediol, N-(beta-hydroxy-propyl)-N'-(beta-aminoethyl)-piperazine, tris(hydroxymethyl) amino-methane (also known as trismethylolaminomethane), 2-amino-1-butanol, ethanolamine, beta-(beta-hydroxyethoxy)ethylamine, and the like. Mixtures of these or similar amines can also be employed. The above description of neucleophilic reactants suitable for reaction with the hydrocarbyl substituted dicarboxylic acid or anhydride includes amines, alcohols, and compounds of mixed amine and hydroxy containing reactive functional groups, i.e., amino-alcohols.

In preparing the Component B dispersants, further improved low temperature CCS viscosity properties can be imparted to the dispersant described hereinabove for a given high temperature viscosity by selecting the nucleophilic reactant to have a Degree of Reactive Functionality (DRF) of at least 3 and typically from about 3 to about 12, preferably from about 4 to about 11, and most preferably from about 5 to about 9. By Degree of Reactive Functionality is meant the number of functional groups selected from amine (e.g., primary or secondary) and hydroxy, on the nucleophilic reactant molecule, available for reaction with the dicarboxyl or anhydride groups of the hydrocarbyl substituted dicarboxylic acid. Where the nucleophilic reactant is a mixture of different compounds, the DRF of the nucleophilic reactant is the average of the sum of the mathematical products of the mole % of each component compound in the mixture times the DRF of that component. It has been found that if one supplies more than about 2 moles of hydrocarbyl substituted dicarboxylic acid or anhydride per mole of said basic reactant having a DRF of at least 3, one will achieve a degree of branching needed to realize a further CCS viscosity improvement at constant high temperature viscosity (attributable to branching). Thus, where the DRF of the basic reactant is in excess of 3, it is not necessary that all of the reactive functional groups present on the nucleophilic reactant be reacted with a stoichiometric equivalent of hydrocarbyl substituted dicarboxylic acid or anhydride moiety to achieve an improvement in CCS viscosity. However, it is advantageous to maximize branching by utilizing the maximum stoichiometry (e.g. moles of diacid moiety) permitted by the DRF of the nucleophilic reactant which will retain its engine performance properties.

Accordingly, in preparing the Component B dispersants, when employing a nucleophilic reactant having a DRF of 3 or greater as described above, the mole ratio of hydrocarbyl substituted acid or anhydride moiety to nucleophilic reactant equivalents is controlled in this embodiment to be typically at least 0.2, preferably at least 0.3, and most preferably at least 0.4, and can vary typically from about 0.2 to about 1.0, preferably from about 0.3 to about 0.75, and most preferably from about 0.35 to about 0.6.

A preferred group of ashless dispersants are those derived from polyisobutylene substituted with succinic anhydride groups and reacted with polyethylene amines, e.g., tetraethylene pentamine, pentaethylene hexamine, polyoxyethylene and polyoxypropylene amines, e.g, polyoxypropylene diamine, trismethylolaminomethane and pentaerythritol, and combinations thereof. One particularly preferred dispersant combination involves a combination of (i) polyisobutene substituted with succinic anhydride groups and reacted with (ii) a hydroxy compound, e.g., pentaerythritol, (iii) a polyoxyalkylene polyamine, e.g., polyoxypropylene diamine, and (iv) a polyalkylene polyamine, e.g., polyethylene diamine and tetraethylene pentamine using about 0.3 to about 2 moles. each of (ii) and (iv) and about 0.3 to about 2 moles of (iii) per mole of (i) as described in U.S. Pat. No. 3,804,763. Another preferred dispersant combination involves the combination of (i) polyisobutenyl succinic anhydride with (ii) a polyalkylene polyamine, e.g., tetraethylene pentamine, and (iii) a polyhydric alcohol or polyhydroxy-substituted aliphatic primary amine, e.g., pentaerythritol or triamethylolaminomethane as described in U.S. Pat. No. 3,632,511.

The dispersant mixtures of the present invention will generally comprise from about 10 to 90 wt. % of dispersant A and from about 90 to 10 wt. % of dispersant B, preferably from about 15 to 70 wt. % of dispersant A and about 85 to 30 wt. % of dispersant B, and more preferably from about 40 to 80 wt. % of dispersant A, and about 20 to 60 wt. % of dispersant B, calculated as the respective active ingredients (e.g., exclusive of diluent oil, solvent or unreacted polyalkene). Preferably, the weight:weight ratios of dispersant A to dispersant B will be in the range of from about 0.2:1 to 2.3:1 and, more preferably from about 0.25:1 to 1.5:1.

The dispersant mixtures of the present invention can be incorporated into a lubricating oil in any convenient way. Thus, these mixtures can be added directly to the oil by dispersing or dissolving the same in the oil at the desired level of concentrations of the dispersant and detergent, respectively. Such blending into the additional lube oil can occur at room temperature or elevated temperatures. Alternatively, the dispersant mixture can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

The lubricating oil basestock for the dispersant mixture typically is adapted to perform a selected function by the incorporation of additional additives therein to form lubricating oil compositions (i.e., formulations).

LUBRICATING COMPOSITIONS

Lubricating oil compositions, e.g. automatic transmission fluids, heavy duty oils suitable for gasoline and diesel engines, etc., can be prepared with the additives of the invention. Universal type crankcase oils wherein the same lubricating oil compositions can be used for both gasoline and diesel engine can also be prepared. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, etc.

In the preparation of lubricating oil formulations it is common practice to introduce the additives in the form of 10 to 80 wt. %, e.g. 20 to 80 wt. % active ingredient concentrates in hydrocarbon oil, e.g. mineral lubricating oil, or other suitable solvent. Usually these concentrates may be diluted with 3 to 100, e.g. 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a metal hydrocarbyl sulfonate or a metal alkyl phenate would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500) ; and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, die-icosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)disiloxane, poly(methyl)siloxanes and poly (methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$–$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC—ArR_1—X_y(ArR_1OH)n \quad (V)$$

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (VI):

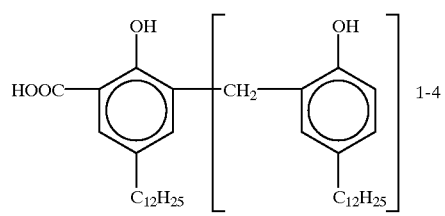

with a TBN of 60 to 150 is highly useful in this invention.

The sulfurized metal phenates can be considered the "metal salt of a phenol sulfide" which thus refers to a metal salt whether neutral or basic, of a compound typified by the general formula (VII):

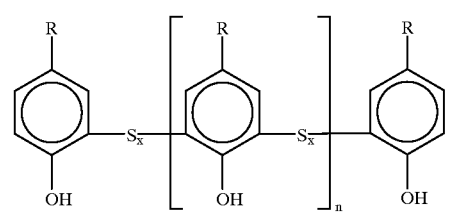

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

As indicated earlier, a particular advantage of the novel dispersant mixtures of the present invention is use with V.I improvers to form multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc. , include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$–$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinyl-pyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl)pyrrolidone, N-vinyl-5-methyl pyrrolidone, N-vinyl-3,3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

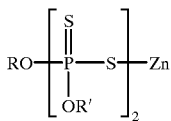

(VIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e. R and R' in formula VIII) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_n Cu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e, R and R') will generally be about 5 or greater. Copper sulphonates, phenates, and acetylacetonates may also be used.

Exemplary of useful copper compounds are copper ($cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating or fuel composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such antirust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboylic acids are also suitable. Acids useful in preparing these esters are lauric acid, stearic acid, succinic acid, and alkyl- or alkenyl-substituted succinic acids wherein the alkyl- or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

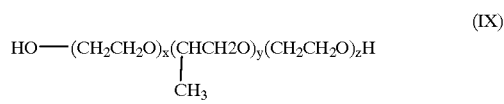

(IX)

wherein x,y, and z are integers greater than 1 such that the —$CH_2CH_2O$—groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

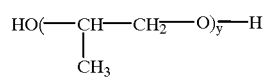
(X)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4 thiadiazoles such as those described in U.S. Pat. Nos. 2,719,125; 2,719,126; and 3,087,932; especially preferred is the compound 2,5 bis (t-octadithio)-1,3,4 thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |

-continued

| Compositions | Wt. % A.I. (Preferred) | Wt. % A.I. (Broad) |
| --- | --- | --- |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersant mixtures of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersant mixture of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. In the Examples, SA:PIB ratios are based upon the total PIB charged to the reactor as starting material, i.e., both the PIB which reacts and the PIB which remains unreacted.

EXAMPLE 1

Preparation of Dispersant

Part A

A polyisobutenyl succinic anhydride (PIBSA) having a SA:PIB ratio of 1.13 succinic anhydride (SA) is prepared by heating a mixture of 100 parts of polyisobutylene(2225 $M_n$; $M_w/M_n$~2.5) with 6.14 parts of maleic anhydride to a temperature of about 220° C. When the temperature reaches 120° C., the chlorine addition is begun and 5.07 parts of chlorine at a constant rate are added to the hot mixture for about 5.5 hours. The reaction mixture is then heat soaked at 220° C. for about 1.5 hours and then stripped with nitrogen for about one hour. The resulting polyisobutenyl succinic anhydride has an ASTM Saponification Number of 54. The PIBSA product is 80 wt. % active ingredient (A.I.), the remainder being primarily unreacted PIB.

Part B

The PIBSA product of Part A is aminated and borated as follows:

104.4 parts of the PIBSA product having a Sap. No. of 54 and 66.76 parts of S150N lubricating oil (solvent neutral oil having a viscosity of about 150 SUS at 100° C.) is mixed in a reaction flask and heated to about 149° C. Then 4.99 parts of a commercial grade of polyethyleneamine (hereinafter referred to as PAM), which is a mixture of polyethyleneamines averaging about 5 to 7 nitrogens per molecule, is added and the mixture heated to 149° C. for about one hour, followed by nitrogen stripping for about 1.5 hours. Next, 2.66 parts of boric acid is added over about two hours while stirring and heating at 163° C., followed by two hours of nitrogen stripping, then cooling and filtering to give the final product. This product has a viscosity of 896 cSt. at 100° C., a nitrogen content of 0.96 wt. %, a boron content of 0.25 wt. % and contains about 50 wt. % of the reaction product, i.e. the material actually reacted, and about 50 wt. % of unreacted PIB and mineral oil (S150N).

EXAMPLE 2

Part A

A polyisobutenyl succinic anhydride (PIBSA) having a SA:PIB ratio of 1.54 succinic anhydride (SA) moieties per polyisobutylene (PIB) molecule of 950 $M_n$ ($M_w/M_n$~1.8) is prepared by heating a mixture of 2800 parts of polyisobutylene with 260 parts of maleic anhydride from 120° C. to a temperature of about 220° C. over 4 hours, which is then maintained at 220° C. for an additional 2 hours. 50 parts of additional maleic anhydride is added at the end of each hour during this 6-hour period (i.e. 250 additional parts of maleic anhydride). During the entire 6-hour period, 458 parts of chlorine at a constant rate is added to the hot mixture. The reaction mixture is then heated for another hour at 220° C. The reaction mixture is then stripped with nitrogen for about 1 hour. The resulting polyisobutenyl succinic anhydride has an ASTM Saponification Number of 157.

The PIBSA product is 93 wt. % active ingredient (A.I.), the remainder being primarily unreacted PIB.

Part B—Amination

The PIBSA of Part A is aminated as follows: 1500 g of the PIBSA having a Sap. No. of 157 and 1847 g of S150N lubricating oil (solvent neutral oil having a viscosity of about 100 SUS at 37.8° C.) is mixed in a reaction flask and heated to about 150° C. Then 187 g of a commercial grade of polyethyleneamine (herein also referred to generically as a polyalkylene amine or PAM) which is a mixture of polyethyleneamines averaging about 5 to 7 nitrogens per molecule (i.e., a DRF of 5 to 7) is added over one hour, followed by nitrogen stripping for about 1.5 hours.

Part C—Boration

The dispersant product of Part B is further reacted with 273 g boric acid, which is added over about 2 hours while stirring and heating at 160° C., followed by 2 hours of nitrogen stripping, then cooling and filtering to give the final product. This final product has a viscosity of 485 cSt. at 100° C., a nitrogen content of 1.74 wt. %, a boron content of 0.37 wt. % and contains 46 wt. % of the reaction product, i.e. the material actually reacted, and 64 wt. % of unreacted PIB and mineral oil (S150N).

Comparative Example 3

Part A

The procedure of Example 2, Part A is repeated except that the polyisobutylene used in Part A comprises 2,800 g. of a mixture containing 60 wt. % of polyisobutylene having $M_n$ of 2225 $M_w/M_n$~2.7) and 40 wt. % of a polyisobutylene having $M_n$ of 950 ($M_w/M_n$=1.8), to provide a mixed polyisobutylene having a $M_n$ of about 1411 ($M_w/M_n$=3.0), and except that 328 g. of maleic anhydride (200 g. added initially, and 25.6 g. added thereafter per hour) and 265.4 g of $Cl_2$ are used. The resulting polyisobutenyl succinic anhydride (PIBSA) product has a SA:PIB ratio of 1.39 succinic anhydride (SA) moieties per polyisobutylene (PIB) molecule, and is 91 wt. % A.I., the remainder being primarily unreacted PIB.

Part B—Amination

The PIBSA of Part A is aminated as follows: 1610 g. of the PIBSA having a Sap. No. of 101 and 1333 g. of S150N lubricating oil (solvent neutral oil having a viscosity of about 150 SUS at 37.8° C.) is mixed in a reaction flask and heated to about 150° C. Then 133.5 g. of a commercial grade of polyethyleneamine (herein also referred to generically as a polyalkylene amine or PAM) which is a mixture of polyethyleneamines averaging about 5 to 7 nitrogens per molecule (i.e., a DRF of 5 to 7) is added over one hour, followed by nitrogen stripping for about 1.5 hours.

Part C—Boration

The dispersant product of Part B is further reacted with 52.3 g. boric acid, which was added over about 2 hours while stirring and heating at 160° C., followed by 2 hours of nitrogen stripping, then cooling and filtering to give the final product. This final product has a viscosity of 899 cSt at 100° C., a nitrogen content of 1.43 wt. %, a boron content of 0.31 wt. % and contained 52.7 wt. % of the reaction product, i.e. the material actually reacted, and 47.3 wt. % of unreacted PIB and mineral oil (S150N).

Comparative Example 4

Part A

The procedure of Example 3, Part A is repeated except that the polyisobutylene used in Part A comprises 2800 g. of a mixture containing 72 wt. % of the polyisobutylene having $M_n$ of 2225 and 28 wt. % of the polyisobutylene having $M_n$ of 950, to provide a mixed polyisobutylene having a $M_n$ of about 1596, and except that 271.3 g. of maleic anhydride (171.3 g. added initially, and 20 g. added thereafter per hour) and 220.8 g. of $Cl_2$ are used. The resulting polyisobutenyl succinic anhydride (PIBSA) product has a SA:PIB ratio of 1.33 succinic anhydride (SA) moieties per polyisobutylene (PIB) molecule, and is 89 wt. % A.I., the remainder being primarily unreacted PIB.

Part B—Amination

The PIBSA of Part A is aminated as follows: 1624 g. of the PIBSA having a Sap. No. of 86.7 and 1330 g. of S150N lubricating oil (solvent neutral oil having a viscosity of about 150 SUS at 37.8° C.) is mixed in a reaction flask and heated to about 150° C. Then 116.6 g. of a commercial grade of polyethyleneamine (herein also referred to generically as a polyalkylene amine or PAM) which is a mixture of polyethyleneamines averaging about 5 to 7 nitrogens per molecule (i.e., a DRF of 5 to 7) is added over one hour, followed by nitrogen stripping for about 1.5 hours.

Part C—Boration

The dispersant product of Part B is further reacted with 48.7 g. boric acid, which was added over about 2 hours while stirring and heating at 160° C., followed by 2 hours of nitrogen stripping, then cooling and filtering to give the final product. This final product has a viscosity of 4765 cSt at 100° C., a nitrogen content of 1.25 wt. %, a boron content of 0.29 wt. % and contained 53.2 wt. % of the reaction product, i.e. the material actually reacted, and 46.8 wt. % of unreacted PIB and mineral oil (S150N).

EXAMPLE 5

A series of mixtures of the borated polyisobutenyl succinimide products of Example 1, Part C, and Example 2, Part C are made, and the kinematic viscosities (cSt at 100° C.) of each such blend is determined and compared to the kinematic viscosities (cSt at 100° C.) of the borated polyisobutenyl succinimide products of Comparative Example 3 and Comparative Example 4. The data thereby obtained are set forth in the following table.

TABLE 1

| Blend | Ex. 1, Part C wt. % | Ex. 2, Part C | $\overline{M}_n$(1) | SA:PIB(2) | Wt. % N(3) | Kv(cSt, 100° C.) |
|---|---|---|---|---|---|---|
| Dispersant | | | | | | |
| Comparative Ex. 3, Part C | | | 1411 | 1.39 | 1.43 | 899 |
| Comparative Ex. 4, Part C | | | 1596 | 1.33 | 1.25 | 4765 |
| — | 100 | 0 | 2225 | 1.13 | 0.96 | 896 |
| A | 80 | 20 | 1874 | 1.24 | 1.12 | 784 |
| B | 65 | 35 | 1650 | 1.31 | 1.23 | 702 |
| C | 50 | 50 | 1455 | 1.37 | 1.35 | 640 |
| D | 35 | 65 | 1284 | 1.43 | 1.47 | 582 |
| E | 20 | 80 | 1129 | 1.48 | 1.58 | 529 |
| — | 0 | 100 | 950 | 1.54 | 1.74 | 484 |

Notes:

(1) For Comparative Example 3, Comparative Example 4, Example 1, and Example 2, number average molecular weight of polyisobutenyl substituents, determined upon polyisobutylene (PIB) starting material by gel permeation chromatography. For Blends B–E, apparent average $M_n$ calculated for comparison purposes.

(2) SA:PIB for Blends A–E calculated for comparison purposes by ratioing all of the equivalents of SA to all of the equivalents of PIB in the Blend. No PIBSA having these SA:PIB ratios were actually introduced into the animation reaction media.

(3) Wt. % N for Blends A–E calculated as weighted average.

The data in the above Table I are graphically illustrated in the accompanying FIG. 1. From the above data, it can be readily seen that the viscosities of the dispersant mixtures of this invention are significantly below the viscosities of the borated dispersant of Comparative Example 3, Part C and dramatically lower than the viscosity of the borated dispersant of Comparative Example 4, Part C, at comparative apparent $M_n$ of the associated PIB.

EXAMPLES 6–7

Comparative Examples 8–9

A series of four fully formulated lubricating oils are prepared to illustrate the improved engine performance obtained by use of the dispersant-mixture additives of this invention. The dispersant-mixtures comprise:

Example 6:
46.3 wt. % product of Ex. 1, Part C
53.7 wt. % product of Ex. 2, Part C
Example 7:
60.9 wt. % product of Ex. 1, Part C
39.1 wt. % product of Ex. 2, Part C
Engine Tests Caterpillar 1G-2 Tests are carried out (except the tests are for 120 hours rather than the full 480 hour test described in ASTM Document for Single Cylinder Engine Test for Evaluating the Performance of Crankcase Lubricants, Caterpillar 1-G2 Test Method, Part 1, STP 509A, on each crankcase motor oil to determine the TGF (top groove fill) and WTD (weighted total demerits) value for each one.

The data thereby obtained are summarized in Table II below.

TABLE II

| Example | Lubricating Oil Dispersant | Composition: Dispersant Wt. %(1) | $\overline{M}$n(2) | SA: PIB (3) | TGF (120 hr) | WTD (120 hr) |
|---|---|---|---|---|---|---|
| 6 | (As above) | 6.67 | 1411 | 1.39 | 56 | 167 |
| 7 | (As above) | 6.67 | 1596 | 1.33 | 55 | 321 |
| Comp. 8 | Comp. Ex. 3, C | 6.67 | 1411 | 1.39 | 67 | 411 |
| Comp. 9 | Comp. Ex. 4, C | 6.67 | 1596 | 1.33 | 58 | 380 |

Notes:

(1) Dispersant wt. % based on total product of indicated preparation Example. The formulated lubricating oils each also contain mineral basestock oil (S150N 61.73 wt. % and S600N 17.4 wt. %) and the same amounts of total dispersant (as above), zinc dialkyl dithiophosphate anti-wear additive, ethylene-propylene copolymer VI improver additive, overbased calcium sulfonate and overbased magnesium sulfonate detergent additives, and nonylphenol sulfide antioxidant additive.

(2) Calculated for Examples 6 and 7 as apparent average for comparison purposes.

(3) Calculated for Examples 6 and 7 for comparison purposes described in footnote 2 to Table I above.

The data in Table II illustrate the superior performance of the blended dispersants of this invention when compared to prior art dispersants. When the nitrogen functionality is concentrated in the low molecular weight dispersant component, as in Examples 6 and 7, improved diesel engine performance is observed, particularly in respect of the dispersant blend used in Example 6.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oil soluble dispersant mixture useful as an oil additive comprising:

(A) from about 10 to 90 weight percent of a first dispersant comprising (a) a first hydrocarbyl substituted monocarboxylic acid producing material formed by reacting a first olefin polymer of $C_2$ to $C_{10}$ monoolefin having a number average molecular weight of about 1500 to 5,000 and a first monounsaturated mono acid material selected from the group consisting of acrylic acid, methacrylic acid, crotonic acid, and cinnamic acid, said first acid producing material having an average of 1.05 to 1.25 monocarboxylic acid producing moieties, per molecule of said first olefin polymer present in the reaction mixture used to form said first acid producing material, and (b) a first nucleophilic reactant selected from the group consisting of amines, alcohols, amino-alcohols and mixtures thereof; and (B) from about 90 to 10 weight percent of a second dispersant comprising (a) a second hydrocarbyl substituted monocarboxylic acid producing material formed by reacting a second olefin polymer of $C_2$ to $C_{10}$ monoolefin having a number average molecular weight of about 700 to 1150 and a second monounsaturated mono acid material selected from the group consisting of acrylic acid, methacrylic acid, crotonic acid, and cinnamic acid, said second acid producing material having an average of 1.2 to 2.0 monocarboxylic acid producing moieties, per molecule of said second olefin polymer present in the reaction mixture used to form said second acid producing material; and (b) a second nucleophilic reactant selected from the group consisting of amines, alcohols, amino-alcohols and mixtures thereof.

2. The dispersant mixture according to claim 1, wherein said first and second nucleophilic reactants each comprises an amine.

3. The dispersant mixture of claim 1, wherein said second nucleophilic reactant has a degree of reactive functionality of at least 3 and wherein at least 2 moles of acid producing material per mole of said second nucleophilic reactant are present in said second reaction mixture.

4. The dispersant mixture according to claim 2, wherein said first and second dispersants are borated and wherein each said reaction mixture includes boric acid.

5. The dispersant mixture according to claim 2, wherein said first olefin polymer and said second olefin polymer each comprises polyisobutylene.

6. The dispersant mixture of any one of claims 1 to 5, wherein the ratio of acid producing moieties per molecule of olefin polymer in said first dispersant is from about 1.06 to 1.20 and wherein said ratio in said second dispersant is from about 1.4 to about 1.7.

7. The dispersant mixture of claim 6, wherein said number average molecular weight of said first olefin polymer is from about 1500 to 3,000, and wherein said number average molecular weight of said second olefin polymer is from about 800 to 1,000.

8. The dispersant mixture of claim 6, wherein said first monounsaturated acid material and said second monounsaturated acid material each comprise acrylic acid.

9. The dispersant mixture of claim 6, wherein said dispersant mixture comprises from about 15 to 70 weight percent of said first dispersant and from about 85 to 30 weight percent of said second dispersant.

10. The dispersant mixture according to claim 2, wherein said amine comprises amines containing from 2 to 60 carbon atoms and from 1 to 12 nitrogen atoms per molecule.

11. The dispersant mixture according to claim 10, wherein said amine comprises a polyalkylenepolyamine wherein said alkylene groups contain 2 to 40 carbons and said polyalkylenepolyamine contains from 2 to about 9 nitrogen atoms per molecule.

12. The dispersant mixture according to claim 11, wherein said first hydrocarbyl substituted monocarboxylic acid producing material comprises polyisobutylene of about 1500 to 3000 number average molecular weight substituted with acrylic acid moieties, said second hydrocarbyl substituted mono-carboxylic acid producing material comprises polyisobutylene of about 800 to 1,000 number average molecular weight substituted with acrylic acid moieties, and said amine comprises polyalkylenepolyamine wherein said alkylene groups contain 2 to 6 carbons and said polyalkylenepolyamine contains 3 to 9 nitrogen atoms per molecule.

13. The dispersant mixture according to claim 12, wherein said amine comprises polyethylenepolyamine and each said reaction product is borated.

14. The dispersant mixture of claim 9, wherein said amine has a degree of reactive functionality of from about 3 to about 12, and wherein said second hydrocarbyl substituted acid producing material contains acrylic acid moities wherein from about 0.1 about 1.0 mole of said acrylic acid moities contained in said second olefin polymer is reacted per equivalent of said amine.

15. The dispersant mixture according to claim 13, wherein each said reaction product contains about 0.05 to 2.0 weight percent boron.

16. A process for producing a dispersant mixture useful as an oil additive which comprises:

(a) preparing a first dispersant by reacting (a) a first hydrocarbyl substituted monocarboxylic acid producing material formed by reacting a first olefin polymer of $C_2$ to $C_{10}$ monoolefin having a number average molecular weight of about 1500 to 5,000 and a first monounsaturated mono acid material selected from the group consisting of acrylic acid, methacrylic acid, crotonic acid, and cinnamic acid, said first acid producing material having an average of 1.05 to 1.25 monocarboxylic acid producing moieties, per molecule of said first olefin polymer present in the reaction mixture used to form said first acid producing material, and (b) a first nucleophilic reactant selected from the group consisting of amines, alcohols, amino-alcohols and mixtures thereof;

(b) preparing a second dispersant by reacting (a) a second hydrocarbyl substituted monocarboxylic acid producing material formed by reacting a second olefin polymer of $C_2$ to $C_{10}$ monoolefin having a number average molecular weight of about 700 to 1150 and a second monounsaturated mono acid material selected from the group consisting of acrylic acid, methacrylic acid, crotonic acid, and cinnamic acid, said second acid producing material having an average of 1.2 to 2.0 monocarboxylic acid producing moieties, per molecule of said second olefin polymer present in the reaction mixture used to form said second acid producing material; and (b) a second nucleophilic reactant selected from the group consisting of amines, alcohols, amino-alcohols and mixtures thereof; and (c) admixing said first dispersant and said second dispersant to provide said dispersant mixture containing from about 10 to 90 wt. % of said first dispersant and from about 90 to 10 wt. % of said second dispersant.

17. The process according to claim 16, wherein said first and second nucleophilic reactants each comprises an amine.

18. The process of claim 16, wherein said second nucleophilic reactant has a degree of reactive functionality of at least 3 and at least 2 moles of acid producing material per mole of said second nucleophilic reactant are present in said second reaction mixture.

19. The process according to claim 17, wherein said first and second dispersants are borated and wherein each said reaction mixture includes boric acid.

20. The process according to claim 17, wherein said first olefin polymer and said second olefin polymer each comprises polyisobutylene.

21. The process of any one of claims 16 to 20, wherein the ratio of acid producing moieties per molecule of olefin polymer in said first dispersant is from about 1.06 to 1.20 and wherein said ratio in said second dispersant is from about 1.4 to about 1.7.

22. The process of claim 21, wherein said number average molecular weight of said first olefin polymer is from about 1500 to 3,000 and wherein said number average molecular weight of said second olefin polymer is from about 800 to 1,000.

23. The process of claim 21, wherein said first monounsaturated acid material and said second monounsaturated acid material each comprise acrylic acid.

24. The process of claim 21, wherein said first dispersant and second dispersant are admixed to provide from about 15 to 70 weight percent of said first dispersant and from about 85 to 30 weight percent of said second dispersant in said dispersant mixture.

25. The process according to claim 17 wherein said amine comprises amines containing from 2 to 60 carbon atoms and from 1 to 12 nitrogen atoms per molecule.

26. The process according to claim 25, wherein said amine comprises a polyalkylenepolyamine wherein said alkylene group contain 2 to 40 carbons and said polyalkylenepolyamine contains from 2 to about 9 nitrogen atoms per molecule.

27. The process to claim 26, wherein said first hydrocarbyl substituted monocarboxylic acid producing material comprises polyisobutylene of about 1500 to 3000 number average molecular weight substituted with acrylic acid moieties, and said amine comprises polyalkylenepolyamine wherein said alkylene groups contain 2 to 6 carbons and said polyalkylenepolyamine contains 3 to 9 nitrogen atoms per molecule.

28. The process according to claim 27, wherein said amine comprises polyethylenepolyamine and wherein each said reaction product is borated.

29. The process of claim 24, wherein said amine has a degree of reactive functionality of from about 3 to about 12, and wherein said second hydrocarbyl substituted acid producing material contains acrylic acid moieties wherein from about 0.1 to about 1.0 mole of said acrylic acid moieties contained in said second olefin polymer is reacted per equivalent of said amine.

30. The process according to claim 28, wherein each said process in said dispersant is borated to provide from about 0.05 to 2.0 weight percent boron in said borated dispersant.

31. A concentrate containing from abut 3 to 45 wt. % of the dispersant mixture of claim 1.

32. A concentrate containing from about 10 to 35 wt. % of the dispersant mixture of claim 6.

33. A lubricating oil composition containing from about 0.1 to 20 wt. % of the dispersant mixture prepared according to claim 16.

* * * * *